United States Patent
Lewis et al.

(10) Patent No.: US 9,008,313 B1
(45) Date of Patent: Apr. 14, 2015

(54) SYSTEM AND METHOD FOR GENERATING RANDOM KEY STREAM CIPHER TEXTS

(71) Applicant: Elliptic Technologies Inc., Kanata (CA)

(72) Inventors: Michael James Lewis, Ottawa (CA); Neil Leckett, Ottawa (CA); A. A. Jithra Adikari, Ottawa (CA)

(73) Assignee: Elliptic Technologies Inc., Kanata, Ontario (CA)

( * ) Notice: Subject to any disclaimer, the term of this patent is extended or adjusted under 35 U.S.C. 154(b) by 0 days.

(21) Appl. No.: 14/339,576

(22) Filed: Jul. 24, 2014

(51) Int. Cl.
*H04L 9/06* (2006.01)
*H04L 9/08* (2006.01)

(52) U.S. Cl.
CPC ............ *H04L 9/0816* (2013.01); *H04L 9/0869* (2013.01); *H04L 2209/24* (2013.01)

(58) Field of Classification Search
None
See application file for complete search history.

(56) References Cited

U.S. PATENT DOCUMENTS

| | | | | |
|---|---|---|---|---|
| 8,630,419 | B2 * | 1/2014 | Mori | 380/277 |
| 2002/0172357 | A1 * | 11/2002 | Pham | 380/37 |
| 2003/0021298 | A1 * | 1/2003 | Murakami et al. | 370/535 |
| 2004/0008730 | A1 * | 1/2004 | Helzer | 370/505 |
| 2004/0156325 | A1 * | 8/2004 | Perkins et al. | 370/299 |
| 2006/0126770 | A1 * | 6/2006 | Yamazaki | 375/372 |
| 2007/0146141 | A1 * | 6/2007 | Popplewell et al. | 340/572.8 |
| 2009/0141889 | A1 * | 6/2009 | Nakamura | 380/44 |

OTHER PUBLICATIONS

Satoh et al., "High-Speed Pipelined Hardware ARchitecture for Galois Counter Mode", ISC 2007, LNCS 4779, p. 118-129, 2007.*
Feldhofer et al, "Strong Authentication for RFID Systems Using the AES Algorith", CHES 2004, LNCS 3156, p. 357-370, 2004.*
Drmer et al, "DSPs, BRMAs and a Pinch of Logic: New Recipes for AES on FPGAs", 16th International Symposium on Field-Programmable Custom Computing Machines, 978-0-7695-3307-0/08.*

* cited by examiner

*Primary Examiner* — Peter Poltorak
(74) *Attorney, Agent, or Firm* — Nixon Peabody LLP

(57) ABSTRACT

A system for generating random key stream cipher texts passes an unencrypted random key stream through an AES engine to produce encrypted cipher text having a first block size in a first frequency domain; converts the encrypted cipher text in the first frequency domain to encrypted cipher text in a second frequency domain; and converts the encrypted cipher text having the first block size in the second frequency domain into smaller block sizes. The frequency in the first frequency domain is preferably lower than the frequency in the second frequency domain. The converting of the encrypted cipher text in the first frequency domain to encrypted cipher text in a second frequency domain may be effected by a dual clock domain FIFO.

2 Claims, 2 Drawing Sheets

SYSTEM AND METHOD FOR GENERATING RANDOM KEY STREAM CIPHER TEXTS

FIELD OF THE INVENTION

The present disclosure relates to the field of generating random key stream cipher texts with smaller block sizes of higher frequency.

BACKGROUND

In the field of cryptography, a key stream is a stream of characters that are combined with a plain text message to produce an encrypted message, known as the cipher text. The characters that are combined with the plain text message may be random or pseoudorandom characters, such as bits, bytes, numbers or actual characters like A-Z depending on the usage case.

The Advanced Encryption Standard (AES) is a block cipher logic specification for the encryption of electronic data established by the U.S. National Institute of Standards and Technology (NIST). Generally, an Advanced Encryption Standard (AES) engine has a long critical path. The critical path may be regarded as the path that takes the longest time in a combinational logic system for information to navigate through. As a result AES engines having longer critical paths cannot be run at a higher clock frequency. Further, AES engines are set to deliver large block size cipher texts, usually set at 128 bits. Therefore, the output from AES engines are of large block sizes with lower frequency.

In some applications, however, there is a requirement for smaller block size cipher texts that are of a higher frequency. Existing solutions do not allow the production of small block size cipher texts at a higher frequency.

This background information is provided to reveal information believed by the applicant to be of possible relevance to the present invention. No admission is necessarily intended, nor should be construed, that any of the preceding information constitutes prior art against the present invention.

SUMMARY

In accordance with one embodiment, a method for generating random key stream cipher texts, the method comprises passing an unencrypted random key stream through an AES engine to produce encrypted cipher text having a first block size in a first frequency domain; converting the encrypted cipher text in the first frequency domain to encrypted cipher text in a second frequency domain; and converting the encrypted cipher text having the first block size in the second frequency domain into smaller block sizes, thereby producing smaller block-sized cipher text of the second frequency domain. In one implementation, the frequency in the first frequency domain is lower than the frequency in the second frequency domain, and the converting of the encrypted cipher text in the first frequency domain to encrypted cipher text in a second frequency domain is effected by a dual clock domain FIFO.

Another embodiment is a cryptographic random key stream generator system comprising an AES engine that receives an unencrypted random key stream and produces an encrypted cipher text having a first block size in a first frequency domain; a dual clock domain FIFO that converts said encrypted cipher text in the first frequency domain to encrypted cipher text in a second frequency domain; and at least one register and at least one multiplexer that convert the encrypted cipher text having the first block size in the second frequency domain into smaller block sizes, thereby producing smaller block-sized cipher text of the second frequency domain.

BRIEF DESCRIPTION OF THE DRAWINGS

The foregoing and other advantages of the invention will become apparent upon reading the following detailed description and upon reference to the drawings, in which.

Figure 1:
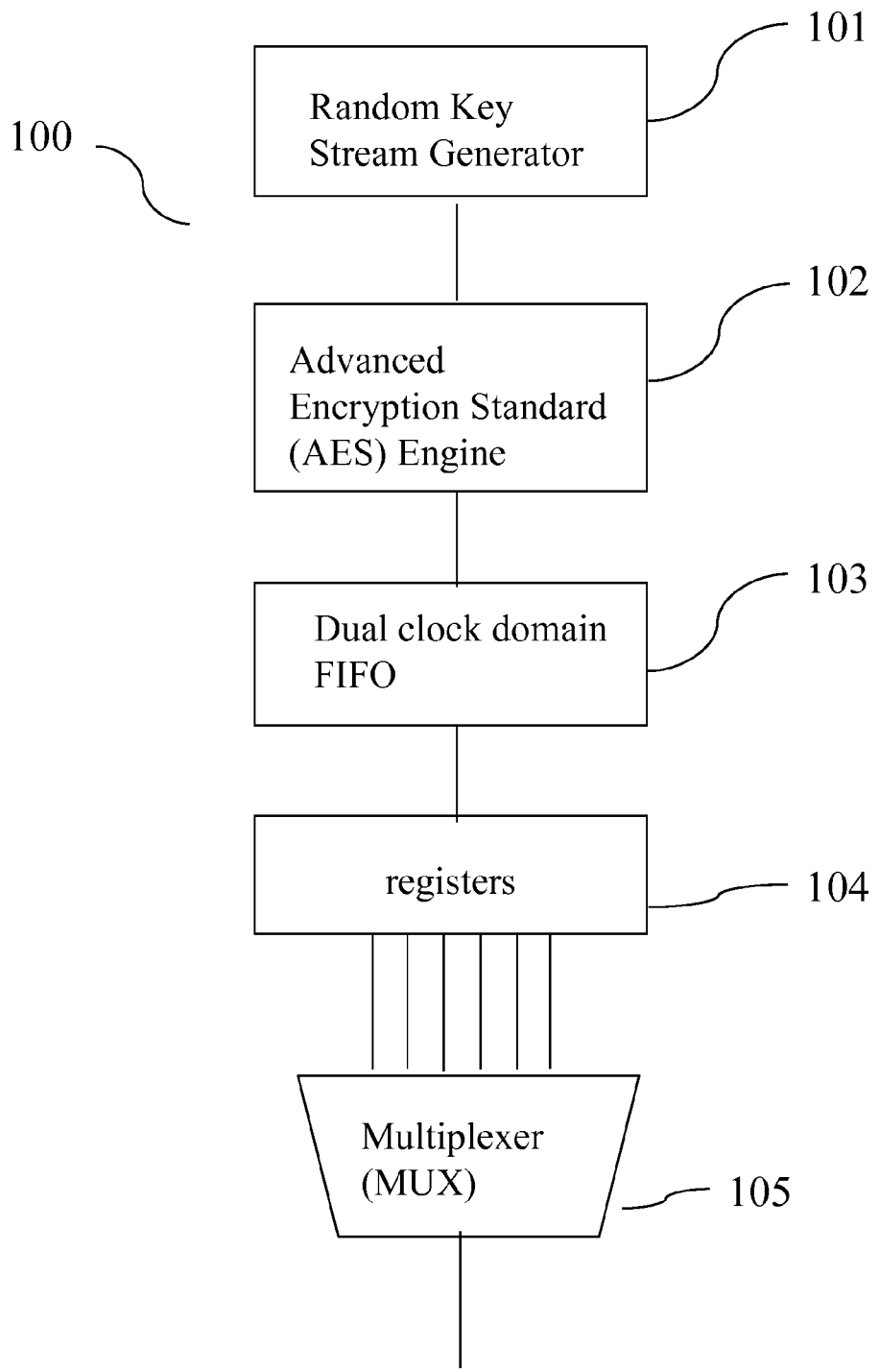
FIG. 1 is a block diagram of a cryptographic random key stream generator system.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Glossary

Cipher Text: Plain data that is encrypted via an encryption process. Cipher text may also be regarded as any data that has gone through a cryptographic process.

Cryptography: Cryptography may be regarded as an algorithm for performing encryption or decryption.

Encryption: In cryptography, encryption is the process by which information is encoded in such a way that only authorized parties can decipher the messages or information.

Decryption: In cryptography, decryption is the process of converting the encrypted information back to its original form.

Cipher: A cryptographic algorithm may be regarded as a cipher.

Key: In cryptography, a key may be regarded as a piece of information that determines the output of a cryptographic algorithm. Without a key, a cryptographic algorithm may not produce any useful result. During encryption, a key specifies the particular transformation of plain text into cipher text. Likewise, during decryption, a key specifies the particular transformation of cipher text into plain text.

Key Size: In cryptography, a key size may be regarded as the size of the key generally measured in bits.

Block Size: In cryptography, a block size may be regarded as the size of the plain text or cipher text measured in bits.

Advanced Encryption Standard (AES): AES was established by the U.S. National Institute of Standards and Technology (NIST) as a standard for the encryption of electronic data. AES has a fixed block size of 128 bits and a key size of 128, 192, or 256 bits.

Dual clock domain First In First Out (FIFO): A dual clock domain FIFO comprises a buffer and two clock domains, one clock domain at the FIFO input interface and a second clock domain at the FIFO output interface.

Description

Referring first to FIG. 1, there is provided a cryptographic random key stream generator system 100 that includes a random key stream generator 101, an AES engine 102, a dual clock domain FIFO 103, a block of registers 104, and a multiplexer (MUX) 105. The random key stream generator

101 generates a random key stream of 128 bits of plain text, which is then passed on to an AES engine 102 for encryption. The AES engine takes the random key stream and encrypts it to produce a random key stream cipher text at a first frequency. The frequency of the plain text and the cipher text are the same. The random key stream generator or an input AES engine may produce block sizes that are larger or smaller than 128 bits.

The random key stream cipher text is written into a dual clock domain FIFO. The write-side of the FIFO is at the same clock frequency as the random key stream cipher text. The dual clock domain FIFO output phase, which is in a different clock domain than the input phase, outputs the random key stream cipher text. The input data width of the dual clock domain FIFO is the same as the output data width of the AES engine.

The cipher text, which is in a second frequency domain, is then scanned to select narrower data samples in the second frequency domain. This may be done by storing the random key stream cipher text in the second frequency in smaller size registers. These smaller blocks of random key stream cipher texts with the second frequency are then passed on to a multiplexer, which feeds the smaller block sized random key stream cipher texts of the second frequency to the appropriate application(s). The first frequency may be lower than the second frequency.

The cryptographic random key stream generator components disclosed herein may be operatively coupled in any manner to produce smaller blocks of random key stream cipher texts of higher frequency. The random key stream generator component may be a combination of an Initialization Vector (IV) and counter, wherein the IV generates a random stream of a certain bit size, and the counter generates sequential increment streams of a certain bit size. They both are then concatenated to produce a random key stream plain text. The bit size of the stream that the IV generates may be 64 bits, and the bit size of the counter stream may also be 64 bits to produce a concatenated large block sized random key stream of 128 bits.

One AES engine may feed multiple dual clock domain FIFOs. Alternatively, multiple AES engines may feed two or more AES streams to a single or multiple dual clock domain FIFOs. It is to be understood that any combination thereof as would be apparent to one of ordinary skill in the art would lie within the scope of this disclosure.

Figure 2:
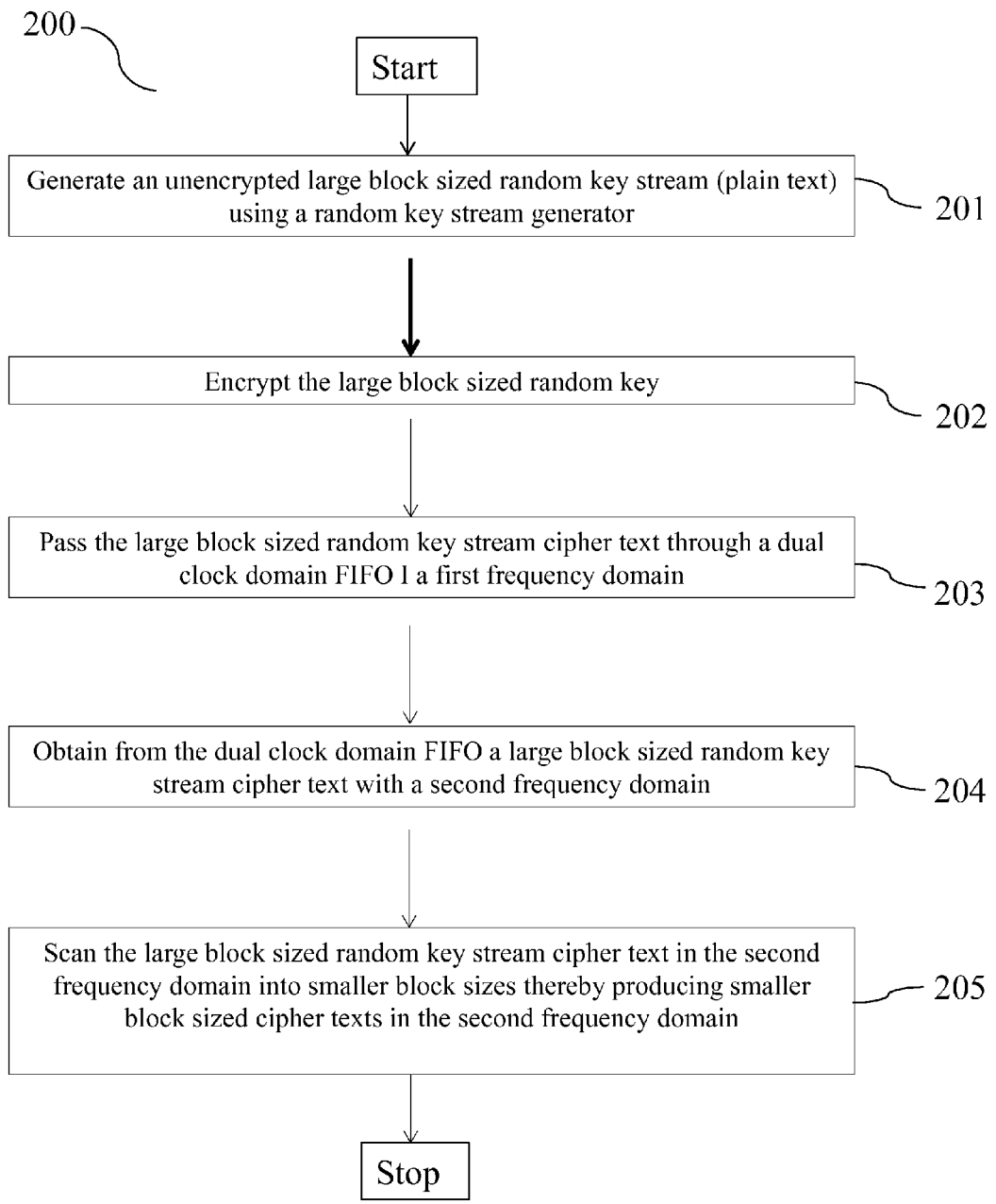
FIG. 2 is a flow chart of a method to generate small blocks of random key stream cipher texts with a second/higher frequency.

FIG. 2 is a flow chart of a method 200 for generating small blocks of random key stream cipher texts with a desired frequency. The process begins at step 201 by generating an unencrypted random key stream (plain text) using a random key stream generator. The unencrypted random key stream is then encrypted in step 202, to produce a key stream cipher text with a first frequency. Both the plain text and cipher text have the same frequency. The random key stream cipher text, which is in a first frequency domain, is then passed through a dual clock domain FIFO in step 203. Then step 204 obtains a large block sized random key stream cipher text, which is in a second frequency domain, from the output of the dual clock domain FIFO. Step 205 then scans the random key stream cipher text across in the higher clock domain to produce smaller data entries that are used for encryption.

The embodiments described herein may be used in any AES random key stream application that requires a higher throughput at higher frequencies. Higher throughput may be achieved by smaller block sizes as opposed to large block sizes. To achieve smaller block sizes of higher frequency sizes would require manufacturing of a large area AES, which would in turn take up more physical area in the Integrated Chip (IC). By utilizing existing AES engines, for example 128 bit engines, in combination with a dual clock domain FIFOs and other components as disclosed herein, savings in physical space can be achieved in ICs.

Although the algorithms described above, including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine-readable instructions may alternatively be used. For example, the order of execution of the blocks may be changed, and/or some of the blocks described may be changed, eliminated, or combined.

It should be noted that the algorithms illustrated and discussed herein as having various modules, which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method for generating random key stream cipher texts, the method comprising
    passing an unencrypted random key stream through an AES engine to produce encrypted cipher text having a first block size in a first frequency domain;
    converting the encrypted cipher text in the first frequency domain to encrypted cipher text in a second frequency domain, the frequency in said first frequency domain being lower than the frequency in said second frequency domain; and converting the encrypted cipher text having the first block size in the second frequency domain into smaller block sizes, thereby producing smaller block-sized cipher text of the second frequency domain, said converting being effected by a dual clock domain FIFO and by having the first block size in the second frequency domain converted into smaller block sizes by storing the encrypted cipher text in the second frequency domain in smaller-size registers.

2. A cryptographic random key stream generator system, comprising:

an AES engine that receives an unencrypted random key stream and produces an encrypted cipher text having a first block size in a first frequency domain;

a dual clock domain FIFO that converts said encrypted cipher text in the first frequency domain to encrypted cipher text in a second frequency domain, the frequency in said first frequency domain being lower than the frequency in said second frequency domain; and at least one register and at least one multiplexer that convert the encrypted cipher text having the first block size in the second frequency domain into smaller block sizes, thereby producing smaller block-sized cipher text of the second frequency domain, said register being small-sized to convert the encrypted cipher text having the first block size in the second frequency domain into smaller block sizes.

\* \* \* \* \*